Figure 1A:
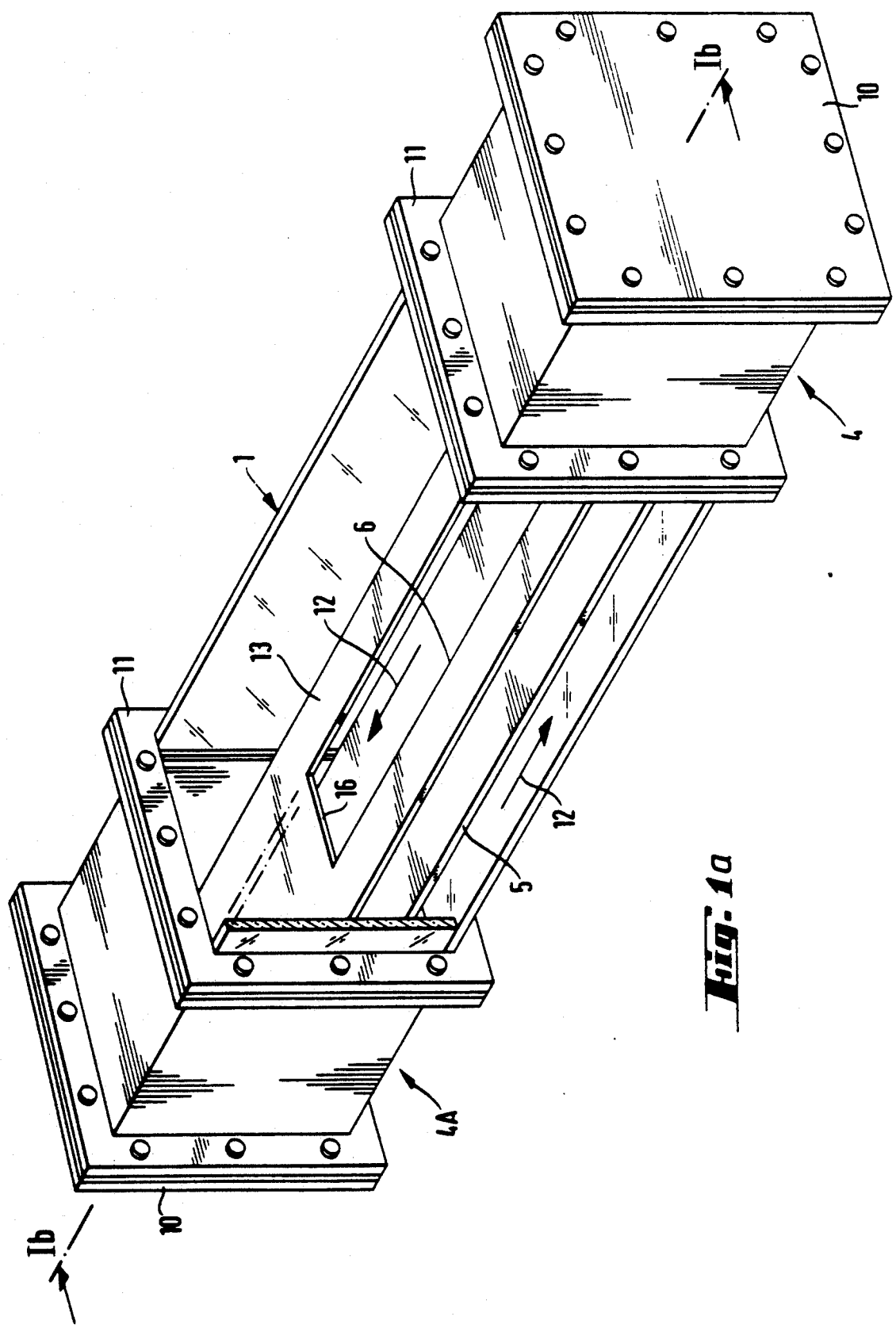

United States Patent [19]

Nitsch et al.

[11] Patent Number: 5,246,498
[45] Date of Patent: Sep. 21, 1993

[54] PROCESS AND APPARATUS FOR PRODUCING THIN LAYERS

[75] Inventors: Walter Nitsch, Feldafing; Christoph Kurthen, Munich, both of Fed. Rep. of Germany

[73] Assignee: Hoechst Aktiengesellschaft, Frankfurt am Main, Fed. Rep. of Germany

[21] Appl. No.: 654,625

[22] PCT Filed: Aug. 19, 1989

[86] PCT No.: PCT/EP89/00978
§ 371 Date: Feb. 21, 1991
§ 102(e) Date: Feb. 21, 1991

[87] PCT Pub. No.: WO90/01998
PCT Pub. Date: Mar. 8, 1990

[30] Foreign Application Priority Data

Aug. 25, 1988 [DE] Fed. Rep. of Germany ....... 3828836

[51] Int. Cl.$^5$ .................. B05C 3/00; B05C 19/02; B05D 1/36; B32B 9/04
[52] U.S. Cl. .................................. 118/429; 118/402; 118/425; 427/402; 427/434.3; 428/339; 428/411.1
[58] Field of Search .................. 118/402, 425, 429; 428/411.1, 339; 427/402, 434.3

[56] References Cited

U.S. PATENT DOCUMENTS

| | | | |
|---|---|---|---|
| 4,599,969 | 7/1986 | Barraud et al. | 118/402 |
| 4,783,348 | 11/1988 | Albrecht et al. | 118/402 |
| 4,978,574 | 12/1990 | Mino | 118/402 |
| 5,021,268 | 6/1991 | Khanarian et al. | 118/402 |

FOREIGN PATENT DOCUMENTS 3621474 2/1987 Fed. Rep. of Germany.

OTHER PUBLICATIONS

A. Barraud et al., Thin Solid Films, 1983, 99, pp. 221-225.
R. Ollenik, W. Nitsch, Bunsenges. Phys. Chem., 1981, 85, pp. 901-904.

Primary Examiner—P. C. Sluby
Attorney, Agent, or Firm—Curtis, Morris & Safford

[57] ABSTRACT

A process for producing a thin layer of at least one amphiphilic compound on a carrier is described, in which an at least partially oriented layer of molecules of an amphiphilic compound is produced by compression and expansion at the interface between a fluid and a polar liquid, and a solid carrier is moved through the layer so that the layer is transferred thereto. For this purpose, a directional flow of the polar liquid which contains amphiphilic molecules in solution or as insoluble molecules in a spread form on the surface is generated in an approximately horizontally located channel and the flow is dammed at a barrier which is located at the fluid/polar liquid interface. The flow velocity and, if appropriate, the concentration of the amphiphilic molecules are selected such that a layer of amphiphilic molecules is continuously formed by compression in front of the barrier at the fluid/polar liquid phase boundary. An apparatus suitable for this purpose comprises a horizontally arranged flow channel for taking up a liquid, a barrier arranged at the phase boundary for damming the surface flow in the channel, a device for generating the flow of the liquid and a device for controlled slow immersion of a solid carrier into the channel and emergence therefrom in proximity to the weir.

38 Claims, 4 Drawing Sheets

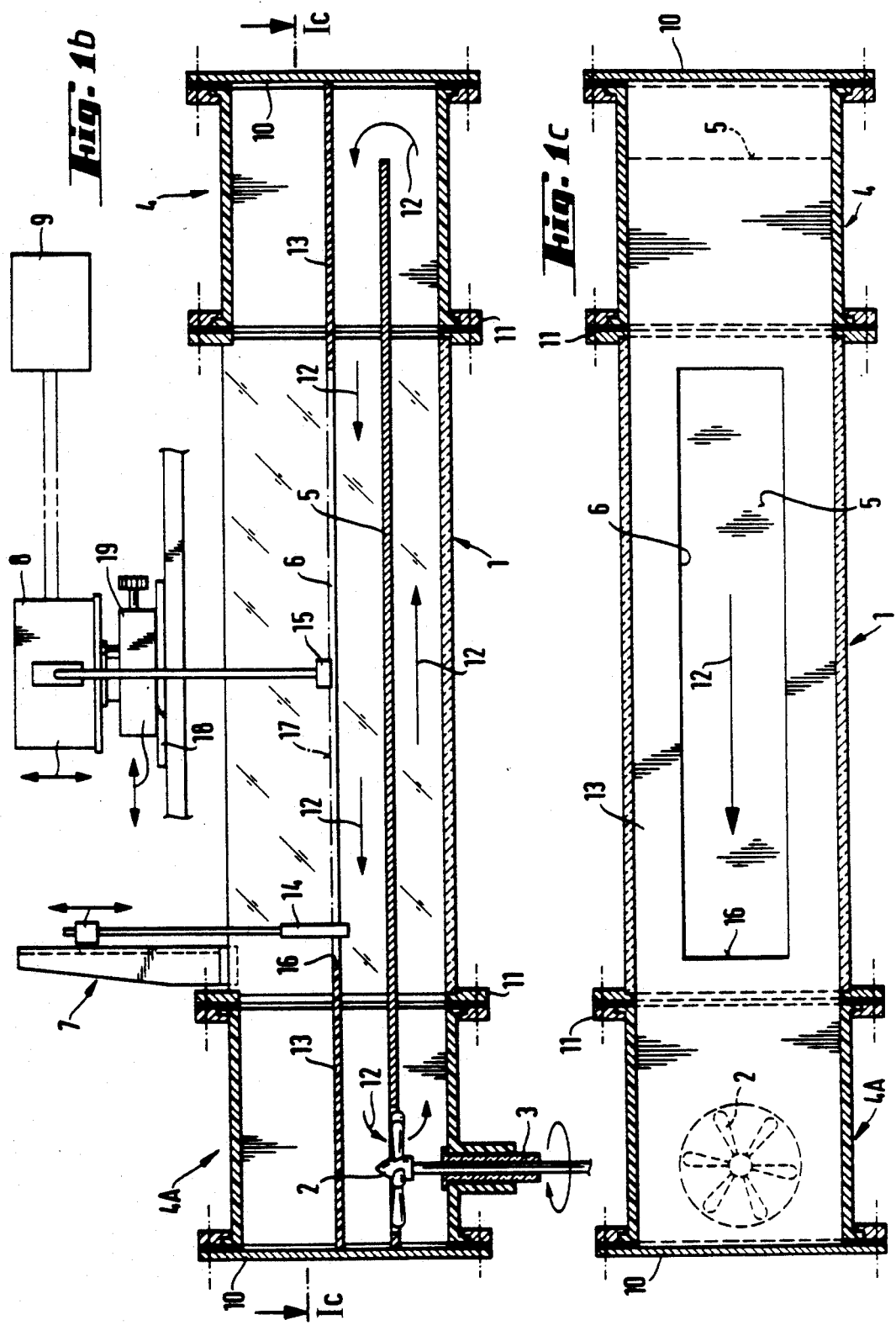

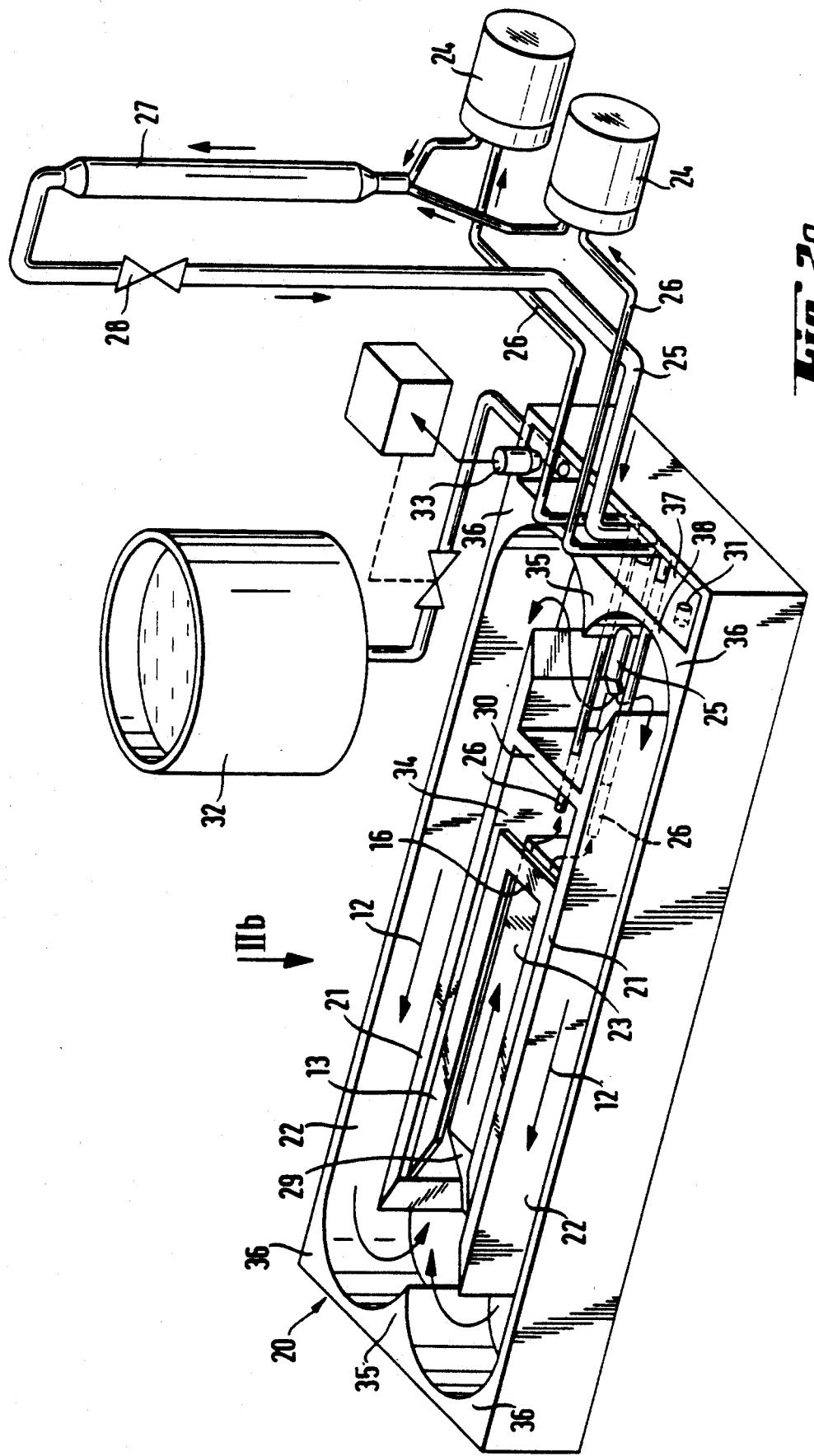

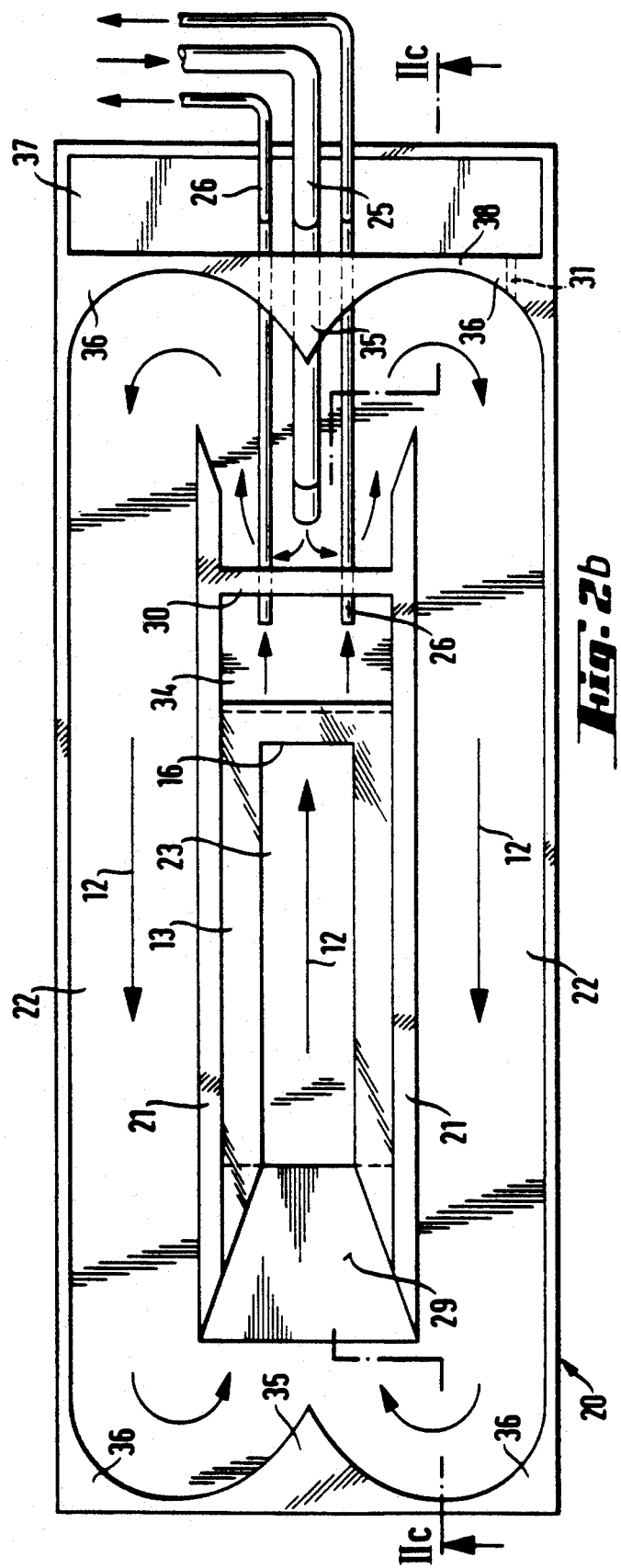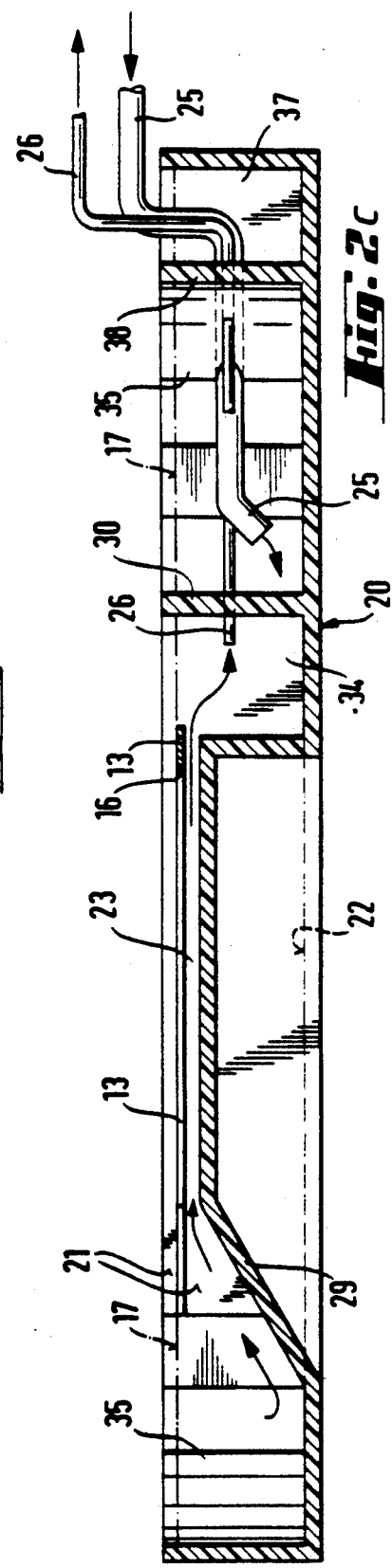

PROCESS AND APPARATUS FOR PRODUCING THIN LAYERS

The invention relates to a process and to an apparatus for producing thin layers of at least one amphiphilic compound on a carrier. In the process according to the invention, boundary layers are produced at the interface between a fluid and a polar liquid, and compressed by flow. The compressed boundary layers are transferred to a solid carrier by the method indicated by Langmuir-Blodgett.

It is known that insoluble layers, spread on liquid surfaces, of amphiphilic molecules can be mechanically compressed by means of so-called push barriers in such a way that, depending on the type of molecule and the compressional state of the surface film when a solid carrier is moved through, the film can be transferred onto this carrier. In particular, the multiple coating thus possible is known as the so-called Langmuir-Blodgett technique and is of great current interest for various applications.

In this method, the compounds are in most cases dissolved in volatile organic solvents. The solution is distributed ("spread") on the surface of the polar liquid (almost always water) and the solvent is then evaporated. The states of high compression required for the transfer of a layer can be produced by movement of a barrier only in the case of insoluble molecules. The Langmuir-Blodgett technique is therefore restricted to compounds which are insoluble in the liquid phase.

To carry out the layer transfer continuously is extremely involved since, in this case, the preceding spreading must also take place continuously. A continuous Langmuir-Blodgett technique with the aid of a mechanical "roller method" has been described by A. Barraud et al. 1983 (Thin Solid Films 99, 221).

Layers of amphiphilic molecules which are soluble in the liquid phase cannot be transferred in the usual mechanical compression in the Langmuir trough, because they "evade" into the subphase as a result of desorption.

It was therefore the object to provide a process, by means of which even those amphiphilic molecules which are soluble in the subphase can be compressed on the surface and transferred. It was a further object to indicate a process, in which both soluble and insoluble amphiphilic molecules can be concentrated continuously on the surface of the subphase and compressed, so that transfer is possible.

The process according to the invention achieves this object. It relates to the production of a thin layer of at least one amphiphilic compound on a carrier, an at least partially oriented layer of molecules of an amphiphilic compound being produced by compression and, if appropriate (for insoluble compounds), prior spreading at the interface between a fluid and a polar liquid, and a solid carrier being moved through the layer so that the layer is transferred thereto. This process comprises generating, in an approximately horizontally located channel, a directional flow of the polar liquid which contains amphiphilic molecules in solution or as insoluble molecules in a spread form on the surface, damming the flow at a barrier arranged in the channel at the fluid/polar liquid interface, selecting the flow velocity and, if appropriate, the concentration of the amphiphilic molecules in such a way that a layer of amphiphilic molecules is continuously formed by compression in front of the barrier at the fluid/polar liquid phase boundary, and moving the carrier through this compression zone. The transfer of the layer itself can be carried out in the process according to the invention in the manner known per se according to the discontinuous technique indicated by Langmuir-Blodgett. Many layers on top of each other can be produced by repeated immersion and pulling-out of the carrier which is to be coated. In most cases, double layers are here transferred (immersion and emergence) However, continuous transfer is also possible. For example, a polyester wire or a polyester film can be immersed at uniform speed into the polar liquid at a position where a rigid boundary layer is not yet present, deflected by rollers and pulled out again from the liquid at the position of the rigid boundary layer. It is thus continuously coated with a monomolecular ply of amphiphilic molecules. The amphiphilic molecules can be ionic or nonionic, low-molecular or high-molecular.

The thin layer applied to the carrier initially represents a monomolecular film. By repeating the process, however, several layers can be applied on top of each other. As in the LB process, films of pure amphiphilic compounds or films composed of a mixture of amphiphilic compounds can be transferred to a carrier.

The fluid used can be a gas or a non-polar liquid which is insoluble in the polar liquid. If two liquid phases are used, the polar liquid can be the upper phase or lower phase (example: interface of toluene/water, containing cephalin as the amphiphilic compound). The non-polar liquid also participates in the directional flow.

The amphiphilic compounds used can be soluble or insoluble. "Soluble" amphiphilic molecules are preferably understood as molecules having a solubility in the polar liquid which is greater than the solubility of hexadecanoic acid in water. In the case of very high solubility, for example acetic acid, highly compressed layers can no longer be produced. However, layers which satisfy simple requirements can still be produced and transferred. Good layers can still be produced if the solubility of the molecules is lower than that of hexanoic acid in water, In the case of soluble amphiphilic molecules, a steady equilibrium is established between molecules which redissolve in the subphase and are continuously resupplied by the flow.

The barrier is preferably arranged in such a way that essentially only the flowing interface carrying the film is dammed, because a particularly well defined flow is possible in this way. No polar liquid should flow over the barrier.

The flow in the channel can be turbulent or laminar. It is advantageous, however, if it is laminar at least just in front of the barrier. In this manner a defined flow form can be achieved, which is essential for the uniformity of the transferred layers.

An increase in the flow velocity has the same effect as an increase of the pressure by the horizontal barrier in the LB technique.

In the case of soluble amphiphilic molecules, an increase in the concentration also leads to an increase in the interfacial pressure and thus in the compression.

If the amphiphilic compound used is insoluble in the polar liquid, it is added in the form of a solution in a solvent, which solution then distributes (=spreads) on the surface of the polar liquid. It is advantageous to feed this solution just after the barrier (up to 10%, approximately, of the overall flow course), because most time is then available for uniform distribution of the amphiphilic molecules on the surface. In spreading of the insoluble amphiphilic compound, a volatile organic solvent is advantageously used. This makes it possible that, depending on the flow velocity and the length of the channel, the volatile solvent is completely evaporated on the flow path from the spreading position to the damming position in front of the barrier. The evaporation can be accelerated by blowing with a carrier gas.

If the amphiphilic compound used is soluble in the polar liquid, the location and manner of addition of the compound are not critical. A uniform build-up of the boundary layer of amphiphilic molecules takes place in the flow channel (in the direction of flow). This can be detected by the steady decrease in interfacial tension which reaches a minimum at the front edge of the barrier. In this case, however, the useful range of the concentration is markedly dependent on the adsorption properties of the amphiphilic compound.

An increase in the flow velocity of the polar liquid increases the backpressure and accelerates the formation of rigid, transferable layers. A low velocity requires, for setting the same backpressure, a lengthening of the damming section (linear section of the channel in front of the weir) or an increase in concentration.

The cross-section of the channel in which the flow is generated is not critical. For example, a U-shaped or V-shaped cross-section can be used. For fabrication reasons, a rectangular cross-section is preferred.

If the barrier is of linear structure, is arranged perpendicular to the direction of flow and does not take up the whole width of the channel, a rigid film is formed only along a relatively short zone. It is better for the barrier to take up the entire width of the channel. It is particularly preferred, however, for the barrier to be a component of a U-shaped or O-shaped frame, the opening of which is arranged to face the direction of flow on the fluid/polar liquid interface. This reduces the effect of peripheral interference. The O-shaped frame usually adopts the form of a rectangle (cf. 13 in FIG. 1a). It is readily suitable for use with amphiphilic molecules soluble in water.

In the simplest case, it is possible to utilize the flowing liquid only once. It is economically advantageous, however, to collect the polar liquid behind the barrier and to return it, in particular continuously, and to use it again for layer formation. The polar liquid is best returned underneath the channel or to the side thereof.

It is known from R. Ollenik and W. Nitsch, Bunsenges. Phys. Chem. 85 (1981), page 901, that a channel flow of two mutually immiscible liquids can be dammed at an edge and, under these conditions, a rigid interfacial layer of an amphiphilic compound can be formed at the interface of the two liquids. Since, in the apparatus described, one of the flowing liquid phases is returned above the rigid interfacial layer, a carrier cannot be immersed into the channel flow from the outside, for spatial reasons. Moreover, it is not described that the observed interfacial layer can be transferred to solid carriers.

The process according to the invention can be carried out with particular ease if only one liquid phase is used, that is to say the fluid is a gas, in particular air.

It is also possible however, for the fluid to be a non-polar liquid which flows in the channel in the same direction as the polar liquid. In this case, it is appropriate also to collect the non-polar liquid behind the barrier and to return it, in particular continuously, underneath or to the side of the channel. If a non-polar liquid is used as the flowing phase, the amphiphilic molecules can also be added to the system as a solution in the non-polar liquid.

Advantageously, the polar liquid is an aqueous phase, for example an aqueous salt solution or water. In a particularly advantageous embodiment of the invention, the polar liquid is water and the added amphiphilic compound is a water-soluble compound, for example a perfluoroalkanecarboxylic acid of 4–14 carbon atoms, or is an enzyme soluble in water. Since no organic solvent is needed for spreading, there is no risk of denaturing.

The carrier should be immersed into the compression zone (zone with a rigid interface) so slowly that the removal of the film, thus effected, from the compression zone does not proceed faster than the reformation of the film in this zone. This applies particularly to the use of amphiphilic compounds which are soluble in the polar liquid.

The formation of a rigid interface layer can be detected either by measuring the backpressure by means of a Wilhelmy balance or in a preliminary test by sprinkling talc particles onto the surface of the flowing liquid (system: gas/polar liquid). The dammed layer and the increase of its length during the experiment can also be detected by a band of light at the bottom of the channel. When illuminated from above, this zone appears darker than the inflow into the channel.

It is found that the backpressure of the interface (definition: interfacial tension of the interface not covered by amphiphilic compounds minus the interfacial tension of the covered surface) increases in the direction of flow and reaches a maximum at the weir.

It is an advantage of the process according to the invention that it also allows layers of soluble amphiphilic molecules to be produced on interfaces and to be transferred from the latter to carriers. For conventional monomolecular films of insoluble amphiphilic molecules, it allows continuous layer formation. An apparatus according to the invention for coating a solid carrier with a monomolecular layer of an amphiphilic compound comprises the following essential constituents:

1. an approximately horizontally arranged channel for a liquid flowing through,
2. a barrier arranged in the channel at the phase boundary for damming the surface flow,
3. a device for generating the flow of the liquid and
4. a device for controlled slow immersion of a carrier into the channel and emergence therefrom in the proximity of the weir.

The chamber may have a gradient for adjusting the level of the interface; it is preferably not more than 10° for the channel used. The compression flow can also be generated solely by inclining the channel. At the end of the channel, there is a pump, for example a circulation pump, which delivers the collected flowing liquid back to the start of the channel. If two liquid phases flow, at least two pumps are necessary.

The channel should have a minimum length which depends on the surface properties of the amphiphilic compound, on the concentration thereof and on the flow velocity. This minimum length can readily be established by experiment. The higher the absorbability, the concentration and the flow velocity, the lower is the minimum length. The length/width ratio of the channel is preferably greater than 1, in particular greater than 2.

As far as possible, the barrier extends only at the position of the fluid/polar liquid interface, that is to say it should have the lowest possible height.

The channel can have a U-shaped cross-section or a rectangular cross-section. The barrier can be arranged in the plane of the interface perpendicular to the direction or flow. It is preferable if it is a component of a U-shaped or O-shaped, horizontally arranged frame. The U-shaped frame is suitable for soluble and especially for insoluble amphiphilic molecules, and the O-shaped frame ("window") is especially suitable for the formation of layers from soluble amphiphilic molecules.

Devices for controlled slow immersion of a solid carrier into a liquid and emergence therefrom (for example a film lift) are known to those skilled in the art from the LB technique.

Carriers in the form of wires or ribbons can be coated continuously. For this purpose, the carrier is immersed into the dammed layer at a position behind the barrier, passed on first by two deflection rollers in the liquid against the direction of flow and drawn off approximately vertically upwards in the region of the damming layer just before the barrier. For winding up coated ribbons, it is preferable not to use cylindrical rollers, but rollers having a concave contour, for example globoid rollers, in order to prevent damage to the transferred film.

In a simple apparatus according to the invention for producing an interfacial film, the outline of the channel approximately corresponds to the shape of the circumference of a rectangle. The barrier is located near to a corner on a longitudinal side. At this corner, the liquid is pumped off from a depression of the channel, so that the liquid level is lower at that point and the liquid flows there, past the barrier. The liquid pumped off can be returned near to the corner on the narrow side to the channel which is at a slightly higher location at this point, so that a flow up to the barrier results. In this case, the flow can also be effected by a rotating water wheel arranged just behind the barrier. In a preferred apparatus for coating a carrier (=substrate), the flowing liquid is returned vertically. The fluid used is a gas, in particular air. This apparatus is shown perspectively in FIG. 1a, where the front glass plate was omitted. FIG. 1b shows the flow channel in section with superstructures, diagrammatically along the line Ib—Ib in FIG. 1a. FIG. 1c shows a section along line Ic—Ic in FIG. 1b.

The polar liquid phase circulated in a closed system was agitated by a 6-bladed stainless steel propeller stirrer (2). The bearing (3) for the stirrer shaft was a calibrated precision glass which lubricates itself with the water. The channel section (1) was composed of opticalgrade glass plates which had been assembled by means of glass solder. At its ends, the, channel section (1) was joined by stainless steel flanges (11) to the housings of the deflection part (4) and delivery part (4A), which were composed of stainless steel. Sealing was effected by PTFE tape. At the deflection part (4), the liquid phase (12) was transported upwards and at the same time deflected in the opposite direction. The partition plate (5) was of VA stainless steel sheet.

On a horizontally displaceable stage (18) above the phase contact area (=rectangular channel window 6 in the PTFE frame 13), a CAHN type 27 microbalance (8), (mounted on a lifting bench (19) with a micrometer drive) was fitted for measuring the surface tension by means of Wilhelmy plates (15). There are also other possibilities for measuring the surface tension. It was possible to place the film lift (7) at any desired positions directly on the upper edge of the channel section. It served for immersing and removing the carrier (14) and was placed, in particular, in front of the edge (16) of the barrier (13), where the surface (17) of the flowing liquid (12) was dammed. The CAHN microbalance (8) was connected to the X-Y recorder (9) and horizontally displaceable. The channel structure was bounded in the longitudinal direction by the two stainless steel plates (10) flanged on.

The channel structure used is a further development of the structure described by Ollenik and Nitsch (loc. cit.). The channel shown can also be modified in such a way that it takes up two liquid phases which flow in the same direction at the contact face. Because of the carrier immersed from above, only the lower liquid phase can be returned vertically.

In another advantageous embodiment of the invention, the flowing liquid is returned horizontally in the apparatus for coating the carrier. This apparatus is shown diagrammatically in FIGS. 2a, 2b and 2c. FIG. 2a shows a perspective illustration of the apparatus. FIG. 2b shows the apparatus in plan view along arrow IIb in FIG. 2a, and FIG. 2c shows a section along the line IIc—IIc of FIG. 2b.

The apparatus is composed essentially of a preferably rectangular outer frame (20) and two inner partitions (21), which effect a subdivision into two side channels (22) and a middle channel (23) which represents the actual flow channel. The flow is dammed at the barrier edge (16) of the frame (13) arranged horizontally at the level of the liquid interface (17).

Flexible ribbon-like articles can be immersed into the relatively shallow channel (23) to the left of the barrier (16 in FIG. 2a). It is preferred, however, to make the barrier displaceable. With a small displacement towards the right (in FIG. 2a), larger articles can then also be immersed through the dammed layer into the chamber (34).

It is an advantage that the cross-section of the middle channel (23) widens by a factor of at least 1:3 behind the horizontally arranged frame (13) and this channel leads into a relaxation chamber (34). This chamber is bounded in the direction of flow by the partition (30). At least one tube (26) for extracting the liquid phase is connected to the chamber (34). Preferably, the extraction is carried out through a plurality of tubes. Uniform extraction per unit area without eddy formation can be effected by means of broad glass frits.

The extraction tube (26) is connected to at least one pump (24) and, if desired, to a flowmeter. A rotameter (27) can be used as the flowmeter. A control valve (28) is provided for controlling the extraction rate.

Via the pumps (24) and at least one tube (25), the liquid phase passes into one or into two side channels (22), from where it can flow back to the side of the middle channel (23) to the front part thereof.

The inflow tube (25) does not end in the chamber (34), but already in front of the wall (30). In the apparatus shown, the liquid impinges on the back of the wall (30). Equally, it would be possible to split the tube into two parts and to let the parts lead into the side channels (22) at the start (at the right-hand end in FIG. 2a).

Only a single side channel (22) is required for the apparatus to function. Two side channels are preferred.

It is advantageous if the two side channels (22) are arranged symmetrically to the central middle channel (23).

It is advantageous when the cross-section, through which liquid flows, of the middle channel is significantly smaller than that in the side channels. The associated increased flow velocity has a favorable effect on the compression and on the formation of a dammed layer in the region of the weir. Advantageously, the cross-section of the middle channel narrows continuously along a zone in the vicinity of the start of the horizontally arranged frame (13). Most simply, this is effected by a wedge-shaped tapering body (29) or by a wedge which is rounded in an S-shape, that is to say has been rheologically improved, and which extends at most up to the end of the frame (13). The narrow side of this wedge also borders the relaxation chamber (34).

It is advantageous when the deflection of the liquid flowing from the side channels into the middle channel (23) takes place with few eddies. For this purpose, the ends of the inner partitions (21) can be rounded or sharpened. The gussets at the inner corners of the rectangle, which form dead flow angles, should be filled (36). It is also advantageous when, in the middle of the short side of the rectangular frame (20) near to the start of the channel, an approximately wedge-shaped deflection body (35) ensures confluence with few eddies of the flows of two side channels.

Preferably, the length/width ratio of the interior dimensions of the rectangular outer frame (20) is at least 2:1.

The apparatus indicated can be largely made of PTFE.

Another part (37) of the channel basin, which is separated by a partition (38) from the flow part (middle channel plus side channels) advantageously serves for regulating the liquid level. There is no convection of the liquid phase in this part of the basin. It is connected via a small orifice (31) to a side channel. The liquid level can be kept constant, even in the case of prolonged duration of the experiment, by means of the adjustable photocell (33), which is connected to a stock tank (32) for liquid.

As described above, soluble amphiphilic compounds can also be used in the subphase. An interesting possibility here is also to use amphiphilic compounds which cannot be transferred by the conventional LB technique, for example perfluoroalkanecarboxylic acids having 4 to 14 carbon atoms, in particular 6-14 carbon atoms, such as, for example, perfluorodecanoic acid.

The invention therefore also relates to a layer element which is composed of at least one ordered layer of an amphiphilic compound on a carrier, the amphiphilic compound not being transferable by the conventional Langmuir-Blodgett technique.

Those amphiphilic compounds are preferred in this case, the water solubility of which is in the range from 0.001 to 100 g/l at 18° C. At higher solubilities, the required backpressure can then be generated only with difficulty. At lower solubilities, the LB method might perhaps also be suitable.

When water-soluble amphiphilic compounds are concentrated at the air/water phase boundary, the surface tension is reduced. A marked reduction is of advantage for the applicability. Therefore, those amphiphilic compounds are preferred which are not miscible with water in all proportions and the saturated aqueous solution of which has a surface tension of at most 65 dynes/cm, preferably at most 50 dynes/cm and especially at most 40 dynes/cm, at 18° C.

In the conventional LB technique, water-soluble amphiphilic compounds tend to evade (to desorb) in the subphase under compression, so that it is impossible to build up the surface pressure required for the transfer. This manifests itself in the fact that the maximum surface pressure obtainable in compression decreases rapidly, when the barrier is not pushed further forward. Therefore, amphiphilic compounds, in the case of which the surface pressure degrades by 10% or more within 5 minutes or less, are not transferable by the LB technique. However, this restriction does not apply to the present process.

The build-up of layer systems having a plurality of monomolecular layers is favored when the amphiphilic compounds used are solid at the transfer temperature and, in particular, have a melting point above 50° C.

From German Patent 3,621,474, it is known that aliphatic compounds having a perfluoroalkyl group, for example fluorocarboxylic acids, can be spread on water and transferred by the LB technique only in the presence of trivalent cations. The layers transferred in this way still contain trivalent cations.

By contrast, it is possible by the process according to the invention to produce layer elements of perfluorocarboxylic acid, having a plurality of monomolecular plies which are free of stabilizing divalent and trivalent cations. However, layers of salts of a perfluorocarboxylic acid with divalent cations such as $Cd^{++}$ or $Mg^{++}$ can also be produced and transferred.

The layers produced by the process according to the invention can be used for many purposes. For example, the transferred component can be an enzyme (catalase) and the enzyme layer can be used for producing the active layer of a biosensor or biocatalyst.

A further possibility is to apply an amphiphilic compound having an unsaturated group to a carrier and then to polymerize it on the latter (for example by the action of light).

By means of the process according to the invention, semiconductors can also be coated, and films or textiles can be finished, and substrates can be prepared for coating.

The invention is explained in more detail by the examples which follow.

EXAMPLE 1

The apparatus described above was used, with a vertical flow system. The stirrer speed was about 160/minute, and the flow velocity averaged over the channel cross-section was about 6.5 cm/second. The length of the channel was 800 mm and the width 80 mm, the volume of the water phase was 2.5 l, the length of the phase contact surface (6) was 35 cm and the width of this channel window was 4 cm.

A layer of arachidonic acid was spread on water as a polar liquid. When the arachidonic acid was compressed by means of the circulating flow to a surface pressure (=surface tension of water—the measured surface tension) of 15 mN/m, this layer was transferable to a glass plate which had been rendered hydrophilic and which is drawn from the water phase through the interface. The transfer of the layer to the plate was detectable by measuring the wetting angle.

If, however, the plate is drawn through the interface outside the dammed layer, the wetting angle of the glass plate remains unchanged, that is to say no layer transfer takes place.

In the region of the dammed layer, in particular at the point of highest interfacial pressure near to the barrier, a new layer was transferred with each repeated removal and immersion of the plate.

EXAMPLE 2

The same apparatus as in Example 1 was used. Aqueous solutions of water-soluble octanecarboxylic acid (concentration: $1.5 \times 10^{-4}$ mol/l) and decanecarboxylic acid (concentration: $3 \times 10^{-5}$ mol/l) were used. By measurement using the CAHN microbalance, it was possible to show that a linear gradient of the interfacial tension formed along the flow window. At a point of highest backpressure (that is to say of lowest interfacial tension) in front of the barrier, it was possible to transfer the dammed layer to a glass plate drawn out of the water phase. However, no transfer of the layer took place if the immersion tests were carried out outside the compressed dammed layer, that is to say at a greater distance in front of the barrier. Here again, it was possible to assess the layer transfer by measuring the wetting angle on the glass plate.

EXAMPLE 3

The apparatus described above was used, with horizontal return of the flowing liquid. The surface tension was measured analogously to Example 1 by means of a CAHN microbalance.

The pump delivery of each of the two Teflon swashplate pumps was 1.6 l/minute, the effective width of the barrier was 38 mm, the length of the frame was 30 cm, and the effective flow cross-section at the weir was 4.2 cm$^2$.

An aqueous solution of perfluorodecanoic acid of a concentration of $5 \times 10^{-5}$ mol/l was used for the experiment. The surface pressure at the transfer location was 40 mN/m. At the point of highest backpressure in front of the barrier, 7 successive coatings (film transfer in both stroke directions, Y type film) were transferred in each case to glass specimen slides (hydrophilic), chromium oxide mirrors and to silicon wafers. The film transfer was detected by wetting angle measurements.

EXAMPLE 4

The same apparatus as in Example 3 was used. Omegatricosenoic acid as a chloroform solution was applied to pure millipore water as the subphase. After a stable dammed layer (backpressure 30 mN/m) had formed in front of the barrier, 3 silicon platelets ($4 \times 1$ cm) were successively coated several times, which had been cleaned with chromic and sulfuric acids and rendered hydrophobic with an aqueous, NH$_4$F-buffered HF solution ( ®Selectipur; manufacturer Merck AG).

Up-and-down stroke movement of the film lift 6 cm/minute. Transfer of 20, 30 and 40 layers. The ellipsometric measurements gave the following overall layer thicknesses:

20 layers: $622.5 \times 10^{-8}$ cm
30 layers: $917.1 \times 10^{-8}$ cm
40 layers: $1223.0 \times 10^{-8}$ cm.

The refractive index was in each case about 1.51.

Each measurement was repeated at 10 different points, including the periphery of the coated surface. This only revealed deviations in the layer thickness of less than 0.5% in each case.

EXAMPLE 5

The same apparatus as in Example 3 was used. A polyamide of the general formula

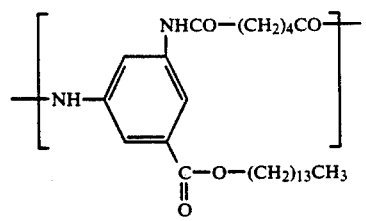

was dissolved in a solvent mixture of 9 parts of dichloromethane and one part of N-methylpyrrolidone, and the polyamide was spread on water. The mean molecular weight of the polyamide was about 25,000.

20 layers were transferred at about 25 mN/m to the Si wafers, rendered hydrophobic, from Example 4. Up-and-down stroke rate of the film lift: 2 cm/minute. The ellipsometric measurement gave a value of 1.515 for the refractive index and $454.3 \times 10^{-8}$ cm for the layer thickness.

EXAMPLE 6

The same apparatus as in Example 3 was used. A nitro dye of the general formula

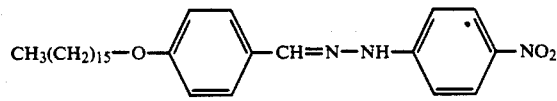

was dissolved in dichloromethane, and the solution of the dye was spread on water.

Transfer at 30 mN/m to glass specimen slides. Stroke rate of the film lift: 2 cm/minute. When 10 and 20 layers were transferred, a homogeneous appearance of the dye layers was obtained in each case.

EXAMPLE 7

Example 3 is repeated. However, the concentration of the perfluorodecanoic acid used was reduced to $3 \times 10^{-5}$ mol/l. The pump delivery was in each case 1.8 l/minute. The surface pressure at the transfer location was 40 mN/m. 20 or 40 layers were transferred successively to silicon wafers, which had been rendered hydrophobic, from Example 4 (film transfer in both stroke directions, Y type film, stroke rate in each case 1 cm/minute).

The ellipsometric measurements gave:
for the refractive index 1.3 in each case
for the layer thicknesses: 20 layers about $250 \times 10^{-8}$ cm; 40 layers about $500 \times 10^{-8}$ cm This corresponds to a mean layer thickness of $12.5 \times 10^{-8}$ cm for an individual layer.

EXAMPLE 8

Example 7 is repeated in the presence of $2 \times 10^{-4}$ M/l of MgCl$_2$. The ellipsometric results correspond to those of Example 7.

EXAMPLE 9

Example 8 is repeated. The transfer of the layers to the carrier was effected at a surface pressure of 50 mN/m. 20, 40 and 60 layers (Y type layers) were transferred to silicon wafers which had been rendered hydrophobic beforehand with dichlorodimethylsilane. The ellipsometric measurements gave the following values:

> 20 layers: $326 \times 10^{-8}$ cm
> 40 layers: $655 \times 10^{-8}$ cm
> 60 layers: $970 \times 10^{-8}$ cm This corresponds to a mean layer thickness of about $16.3 \times 10^{-8}$ cm for an individual layer. The refractive index was 1.35 in each case.

We claim:

1. An apparatus for coating a solid carrier with a monomolecular layer of an amphiphilic compound, comprising
   1. a horizontally arranged flow channel for taking up a liquid,
   2. a barrier arranged horizontally in the flow channel for damming the surface flow in the flow channel,
   3. a device for generating the flow of the liquid and
   4. a device for controlled slow immersion of a solid carrier into the flow channel and emergence therefrom in proximity to the barrier.

2. The apparatus as claimed in claim 1, wherein the barrier is arranged horizontally at the phase boundary.

3. The apparatus as claimed in claim 2, wherein the barrier is a component of a U-shaped or O-shaped, horizontally arranged frame.

4. The apparatus as claimed in claim 3, wherein the cross-section of the flow channel diminishes continuously along a zone in the vicinity of the start of the frame located at the phase boundary.

5. The apparatus as claimed in claim 4, wherein a zone with a constant narrowed cross-section is downstream from the zone with the continuously diminishing cross-section.

6. The apparatus as claimed in claim 5, wherein there is a chamber, the cross-section of which is greater by a factor of at least 3 than in the zone with the continuously diminishing cross-section, and further wherein the barrier is in the region of this chamber.

7. The apparatus as claimed in claim 1, wherein the flow channel has a rectangular cross-section.

8. The apparatus as claimed in claim 1, wherein, downstream of the barrier in the direction of flow, there is a relaxation chamber, the cross-section of which is greater by a factor of at least 3 than the cross-section of the flow channel in the region of the barrier and which contains at least one tube for extracting the liquid phase.

9. The apparatus as claimed in claim 8, wherein the extraction tubes are connected to pumps.

10. The apparatus as claimed in claim 9, wherein said pumps are connected via pipes to at least one side channel, through which the liquid can flow back to the start of the flow channel.

11. The apparatus as claimed in claim 10, wherein the flow channel and side channels are arranged within a rectangular frame.

12. A process for producing a thin layer of at least one amphiphilic compound on a carrier, an at least partially oriented layer of molecules of an amphiphilic compound being produced by compression and spreading at the interface between a fluid and a polar liquid, and a solid carrier being moved through the layer so that the layer is transferred thereto, which comprises generating, in an approximately horizontally located channel, a directional flow of the polar liquid which contains amphiphilic molecules as insoluble molecules in a spread form on the surface, damming the flow at a barrier arranged horizontally in the channel at the fluid/polar liquid interface, increasing the flow velocity until a layer of amphiphilic molecules is continuously formed by compression in front of the barrier at the fluid/polar liquid phase boundary, and moving the carrier through this layer.

13. The process as claimed in claim 12, wherein the flow is generated in a bed of rectangular cross-section.

14. The process as claimed in claim 12, wherein the barrier is a component of a U-shaped frame, the opening of which is arranged to face the direction of flow on the fluid/polar liquid interface.

15. The process as claimed in claim 12, wherein the polar liquid is collected behind the barrier, returned continuously or discontinuously and used again for layer formation.

16. The process as claimed in claim 15, wherein the polar liquid is returned underneath or to the side of the barrier.

17. The process as claimed in claim 12, wherein the solution of an amphiphilic compound insoluble in the subphase is metered onto the fluid/polar liquid interface and spread.

18. The process as claimed in claim 17, wherein the solution is metered on just after the barrier.

19. The process as claimed in claim 17, wherein the solution of an amphiphilic compound, which is insoluble in the polar liquid, is metered on in a volatile organic solvent.

20. The process as claimed in claim 17, wherein the subphase is a polar liquid.

21. The process as claimed in claim 19, wherein the flow velocity and the length of the channel are adjusted such that the volatile solvent has completely evaporated before the barrier.

22. The process as claimed in claim 12, wherein the flow velocity of the polar liquid is set such that the flow is laminar in the region of the barrier.

23. The process as claimed in claim 12, wherein the fluid is a gas.

24. The process as claimed in claim 23, wherein the gas is air.

25. The process as claimed in claim 12, wherein the fluid is a non-polar liquid which flows in the channel in the same direction as the polar liquid, and the non-polar liquid is collected behind the barrier and returned continuously or discontinuously underneath the barrier or to the side thereof.

26. The process as claimed in claim 25, wherein the amphiphilic molecules are metered in the form of a solution in the non-polar liquid into the non-polar liquid.

27. The process as claimed in claim 12, wherein the polar fluid represents an aqueous phase.

28. The process as claimed in claim 12, wherein the carrier is immersed into the compression zone so slowly that the removal of the film, thus effected, from the compression zone does not proceed faster than the reformation of the film in this zone.

29. The process as claimed in claim 12, wherein the barrier is a component of an O-shaped frame, said frame having an inner part and an outer part, arranged at the fluid/polar liquid interface, the polar liquid contains the amphiphilic molecules in solution and, to coat the solid carrier said carrier is immersed in the inner part of the O-shaped frame.

30. A process for producing a thin layer of at least one water soluble amphiphilic compound on a carrier, an at least partially oriented layer of molecules of an amphiphilic compound being produced by compression at the interface between a gas and water, and a solid carrier being moved through the layer so that the layer is transferred thereto, which comprises generating, in an approximately horizontally located channel, a directional flow of water which contains amphiphilic molecules in solution, damming the flow at a barrier arranged horizontally in the channel at the gas/water liquid interface, increasing the flow velocity and the concentration of the amphiphilic molecules until a layer of amphiphilic molecules is continuously formed by compression in front of the barrier at the gas/water phase boundary, and moving the carrier through this layer.

31. The process as claimed in claim 30, wherein the amphiphilic compound is a water-soluble enzyme.

32. The process as claimed in claim 30, wherein the flow is generated in a bed of rectangular cross-section.

33. The process as claimed in claim 30, wherein the barrier is a component of a U-shaped frame, the opening of which is arranged to face the direction of flow on the fluid/polar liquid interface.

34. The process as claimed in claim 30, wherein the polar liquid is collected behind the barrier, returned continuously or discontinuously and used again for layer formation.

35. The process as claimed in claim 30, wherein the polar liquid is returned underneath or to the side of the barrier.

36. The process as claimed in claim 30, wherein the flow velocity of the polar liquid is set such that the flow is laminar in the region of the barrier.

37. The process as claimed in claim 30, wherein the carrier is immersed into the compression zone so slowly that the removal of the film, thus effected, from the compression zone does not proceed faster than the reformation of the film in this zone.

38. The process as claimed in claim 30, wherein the barrier is a component of an O-shaped frame, said frame having an inner part and an outer part, arranged at the fluid/polar liquid interface, the polar liquid contains the amphiphilic molecules in solution and, to coat the solid carrier said carrier is immersed in the inner part of the O-shaped frame.

* * * * *